US007912687B2

(12) United States Patent
Stockner et al.

(10) Patent No.: US 7,912,687 B2
(45) Date of Patent: Mar. 22, 2011

(54) METHODS OF PREDICTING CAVITATION DAMAGE

(75) Inventors: Alan Ray Stockner, Metamora, IL (US); Daniel Richard Ibrahim, Metamora, IL (US); Manolis Gavaises, Athens (GR); Andreas Theodorakakos, Athens (GR)

(73) Assignee: Caterpillar Inc., Peoria, IL (US)

( * ) Notice: Subject to any disclaimer, the term of this patent is extended or adjusted under 35 U.S.C. 154(b) by 572 days.

(21) Appl. No.: 12/000,148

(22) Filed: Dec. 10, 2007

(65) Prior Publication Data
US 2008/0215255 A1 Sep. 4, 2008

Related U.S. Application Data

(60) Provisional application No. 60/877,633, filed on Dec. 29, 2006.

(51) Int. Cl.
*G06F 7/60* (2006.01)
*G06F 17/10* (2006.01)
(52) U.S. Cl. .................................. 703/9; 703/2
(58) Field of Classification Search .................. 703/2, 9
See application file for complete search history.

(56) References Cited

U.S. PATENT DOCUMENTS

| 4,965,743 | A | 10/1990 | Malin et al. |
| 5,332,356 | A | 7/1994 | Gülich |
| 5,537,641 | A | 7/1996 | da Vitoria Lobo et al. |
| 5,801,969 | A | 9/1998 | Nagahama |
| 7,120,544 | B2 * | 10/2006 | Duncan ............................ 702/50 |
| 2004/0112115 | A1 | 6/2004 | Ramamoorthy et al. |
| 2004/0167757 | A1 | 8/2004 | Struijs |
| 2004/0244382 | A1 * | 12/2004 | Hagen et al. .................... 60/775 |

OTHER PUBLICATIONS

Uchiyama T: "Numerical simulation of cavitating flow using the upstream finite element method" Applied Mathematical Modelling, Guildford, GB, vol. 22, No. 4-5, Apr. 1, 1998, pp. 235-250, XP002496138, ISSN: 0307-904X.
Regiane Fortes Patella, Jean-Luc Repoud: "A new approach to evaluate the cavitation erosion power", Journal of Fluids Engineering, ASME, NY, vol. 120, No. 2, Jun. 1, 1998, pp. 335-344, XP009105086, ISSN: 0098-2202.
Stefan Aus Der Wiesche: "Numerical simulation of cavitation effects behind obstacles and in an automotive fuel jet pump" Heat and Mass Transfer; Warmeund Stoffubertragung, Springer, Berlin, DE, vol. 41, No. 7, May 1, 2005, pp. 615-624, XP019330375, ISSN: 1432-1181.

(Continued)

*Primary Examiner* — Dwin M Craig
(74) *Attorney, Agent, or Firm* — Finnegan, Henderson, Farabow, Garrett & Dunner LLP

(57) ABSTRACT

A method is provided for predicting the likelihood of cavitation damage occurring on a surface of a hydrodynamic component. The method may include creating a computational fluid dynamics (CFD) simulation of the hydrodynamic component, wherein creating the CFD simulation includes simulating fluid flowing relative to the hydrodynamic component. The method may also include selecting a location on the surface of the hydrodynamic component, wherein the selected location is exposed to the simulated fluid flow. The method may also include determining and analyzing at least one of a mean pressure and standard deviation, a standard deviation of the rate of change in pressure, a mean void percentage and standard deviation, and a standard deviation of the rate of change in void percentage for the flowing fluid at the selected surface location to predict the likelihood of cavitation damage occurring at the selected surface location.

32 Claims, 3 Drawing Sheets

OTHER PUBLICATIONS

Guillermo Palau Salvador, Steven H. Frankel: "Numerical modeling of cavitation using fluent: Validation and parametric studies", 34th AIAA Fluid Dynamics Conference and Exhibit, Portland, OR, Jun. 28, 2004, pp. 1-9, XP009100615.

A. Thiruvengadam, "The Concept of Erosion Strength," *Erosion by Cavitation or Impingement,* ASTM STP 408, American Society For Testing and Materials, 1967, pp. 22-41.

P. A. Lush, "Impact of a Liquid Mass on a Perfectly Plastic Solid," J. Fluid Mech. (1983), vol. 135, pp. 373-387.

W. Yuan, et al., "Numerical Simulation of Two-Phase Flow in Injection Nozzles: Interaction of Cavitation and External Jet Formation," J. Fluids Eng., vol. 125, pp. 963-969, 2003.

M. Dular, et al., "Numerical and Experimental Study of Cavitating Flow on 2D and 3D Hydrofoils," Fifth International Symposium on Cavitation, Osaka, Japan, Nov. 1-4, 2003, pp. 1-6.

Diesel Fuel Injection System Common Rail, Bosch 2005 Edition, p. 61.

M. Gavaises et al., "Link Between Cavitation Development and Erosion Damage in Diesel Injector Nozzles," *SAE Technical Paper Series*, 2007 World Congress, Detroit, MI, Apr. 16-19, 2007, 21 pages.

\* cited by examiner

METHODS OF PREDICTING CAVITATION DAMAGE

PRIORITY

This application claims the benefits of priority to U.S. Provisional Patent Application No. 60/877,633, entitled METHODS OF PREDICTING CAVITATION DAMAGE, filed on Dec. 29, 2006, the entirety of which is incorporated herein by reference.

TECHNICAL FIELD

The present disclosure relates generally to cavitation damage and, more particularly, to methods of predicting the likelihood of cavitation damage occurring in hydrodynamic components having surfaces exposed to a fluid.

BACKGROUND

Pressurized fluid systems, such as, for example, fuel injectors and pumps, are frequently susceptible to the phenomenon known as "cavitation." As known to those having ordinary skill in the art, cavitation generally refers to the formation of vapor bubbles within a fluid stream when, for example, the fluid's operational pressure drops below the fluid's vapor pressure. For example, cavitation can occur in flowing liquid when the speed or velocity of the liquid increases such that the pressure in the system drops below the vapor pressure of the liquid, resulting in local vaporization of the liquid, which in turn creates a cavity (i.e., hole) or void within the flowing liquid. This low-pressure cavity generally comprises a swirling mass of liquid droplets and vapor bubbles and, although appearing steady to the naked eye, actually forms and reforms many times a second.

Once formed, the low-pressure cavity is generally swept swiftly downstream into a region of high pressure, such as, for example, an eddy zone, where it suddenly collapses as surrounding liquid rushes in to fill the void. As the cavity is collapsing, each and every vapor bubble within the cavity implodes, releasing a momentary burst of concentrated energy. In instances where a cavity's point of collapse is in contact with a boundary wall, such as, for example, the material surface of a hydrodynamic component, the concentrated energy released from each bubble implosion locally stresses the wall surface beyond its elastic limit, and, given sufficient time, causes erosion of wall material. This is known to those of ordinary skill in the art as cavitation damage.

Cavitation damage can be extremely problematic to the performance of hydrodynamic components and, in some instances, may lead to material failure. In addition, cavitation damage can often result in equipment downtime, as well as warranty exposure and negative commercial effects for the equipment's manufacturer.

Previously, hydrodynamic equipment designs were tested and analyzed iteratively. Variables were tested one at a time and determined either through experience or engineered guesses. Design solutions were not tested over multiple variables, and further, many hundred man-hours of resources were expended. Even when experiments were designed to include multiple variables, cavitation damage still remained unpredictable and, consequently, difficult to analyze. This inability to accurately predict and analyze the occurrence of cavitation damage prohibited the ability to appropriately design hydrodynamic components in a manner that compensates for problems associated with cavitation damage, such as, for example, material failure.

Recently, however, assessment and prediction of cavitation damage in components, such as, for example, pumps, turbines, valves, fuel injectors, and propellers, has been addressed in the art by utilizing a sensor to detect and measure structure-borne noise and the vibration of the outer wall of the component through which fluid flows, in order to use numerical calculations to predict erosion rates. For instance, the use of such a sensor is described in U.S. Pat. No. 5,332,356 issued to Gülich on Jul. 26, 1994. Although the use of such sensors appears viable in large components, the small size and complicated construction of some hydrodynamic components, such as, for example, fuel injector nozzles, prohibits the use of intricate sensing devices and associated equipment. In addition, the above-described Gülich methodology still requires constructing at least a functioning model of the component in which the occurrence of cavitation damage is to be predicted. Providing a method to accurately predict cavitation damage in hydrodynamic components, while avoiding the need to construct functioning models of those components, has therefore been problematic and elusive.

The present disclosure is directed to overcoming one or more of the shortcomings set forth above.

SUMMARY OF THE INVENTION

In one aspect, the present disclosure is directed to a method for predicting the likelihood of cavitation damage occurring on a surface of a hydrodynamic component. The method may include creating a computational fluid dynamics (CFD) simulation of the hydrodynamic component, wherein creating the CFD simulation includes simulating a fluid proximal to the surface of the hydrodynamic component. The method may also include selecting a location on the surface of the hydrodynamic component, wherein the selected location is exposed to the simulated fluid. The method may further include determining the mean pressure and standard deviation, the standard deviation of the rate of change in pressure, the mean void percentage and standard deviation, and the standard deviation of the rate of change in void percentage for the fluid at the selected surface location. The method may also include analyzing at least one of the mean pressure and standard deviation, the standard deviation of the rate of change in pressure, the mean void percentage and standard deviation, and the standard deviation of the rate of change in void percentage for the fluid at the selected surface location to predict the likelihood of cavitation damage occurring at the selected surface location.

In another aspect, the present disclosure is directed to a method for predicting the likelihood of cavitation damage occurring at a surface location in a hydrodynamic component having a surface exposed to a fluid. The method may include determining the mean pressure and standard deviation, the standard deviation of the rate of change in pressure, the mean void percentage and standard deviation, and the standard deviation of the rate of change in void percentage for the fluid at the surface location. The method may also include analyzing at least one of the mean pressure and standard deviation, the standard deviation of the rate of change in pressure, the mean void percentage and standard deviation, and the standard deviation of the rate of change in void percentage to predict the likelihood of cavitation damage occurring at the surface location.

In yet another aspect, the present disclosure is directed to a method for predicting the occurrence of cavitation damage. The method may include identifying a hydrodynamic component in which cavitation damage is suspected. The method may also include creating a CFD simulation of the hydrodynamic component, wherein creating the CFD simulation includes simulating a fluid proximal to the hydrodynamic component. The method may further include selecting a surface location on the hydrodynamic component, wherein the selected location is exposed to the fluid. The method may also include determining the mean pressure and standard deviation, the standard deviation of the rate of change in pressure, the mean void percentage and standard deviation, and the standard deviation of the rate of change in void percentage for the fluid at the selected surface location. The method may further include analyzing at least one of the mean pressure and standard deviation, the standard deviation of the rate of change in pressure, the mean void percentage and standard deviation, and the standard deviation of the rate of change in void percentage for the fluid at the selected surface location to predict the occurrence of cavitation damage at the selected surface location.

In another aspect, the present disclosure is directed to a work environment for predicting the likelihood of cavitation damage occurring at a surface location on a hydrodynamic component having a surface exposed to a fluid. The work environment may include a computer configured to receive a plurality of inputs from a user, at least a first portion of the plurality of inputs relating to the hydrodynamic component. The work environment may also include a database configured to store data relating to the fluid. The work environment may further include a computer readable medium containing programming instructions for predicting the likelihood of cavitation damage occurring at the surface location, the programming instructions may include creating a CFD simulation of the hydrodynamic component and simulating the fluid proximal to the hydrodynamic component and determining the mean pressure and standard deviation, the standard deviation of the rate of change in pressure, the mean void percentage and standard deviation, and the standard deviation of the rate of change in void percentage for the fluid at the surface location. The programming instructions may also include analyzing at least one of the mean pressure and standard deviation, the standard deviation of the rate of change in pressure, the mean void percentage and standard deviation, and the standard deviation of the rate of change in void percentage to predict the likelihood of cavitation damage occurring at the surface location.

DETAILED DESCRIPTION

Figure 1:
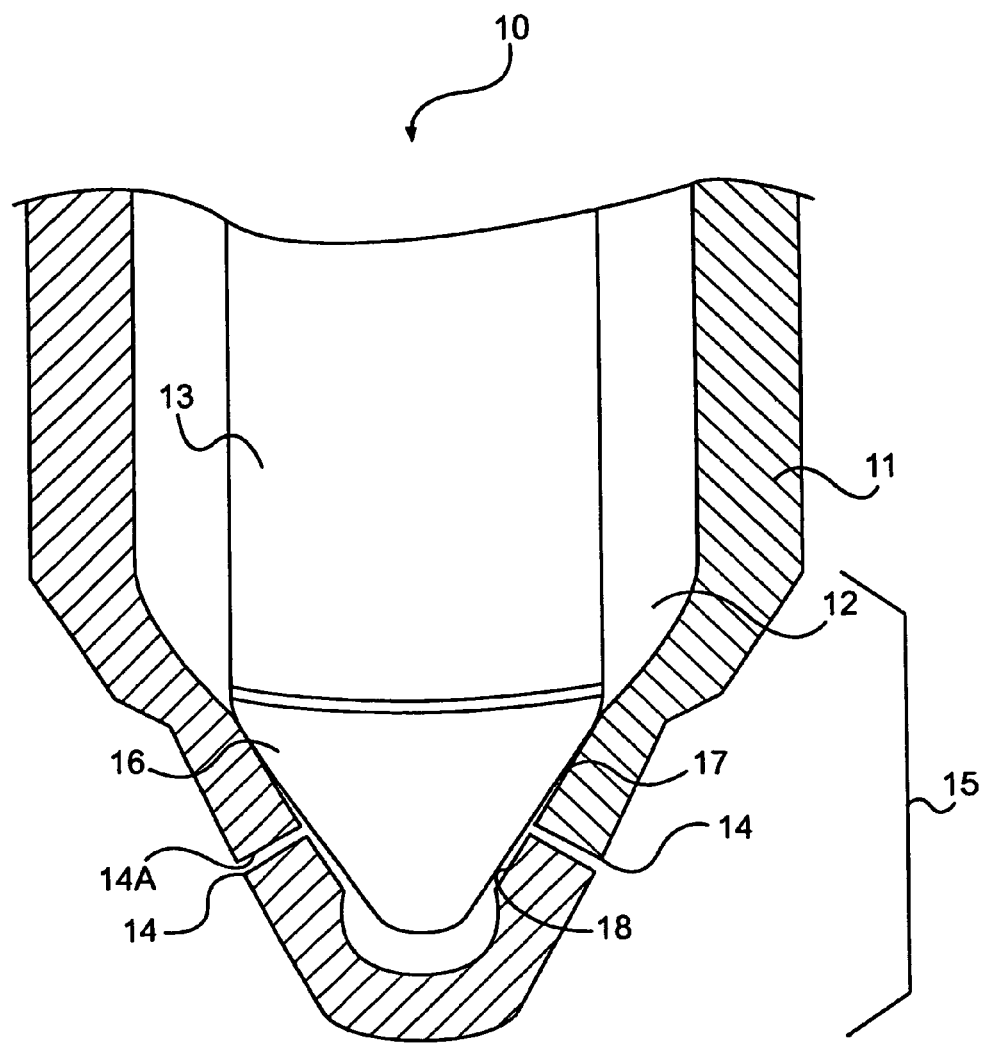
FIG. 1 illustrates an exemplary hydrodynamic component in which the likelihood of cavitation damage occurring may be predicted, in accordance with the present disclosure.

For discussion purposes only, the principles of the present disclosure, including method 100 discussed below, are described in connection with the exemplary hydrodynamic component depicted in FIG. 1. Although the hydrodynamic component depicted in FIG. 1 is represented as a fuel injector nozzle 10, those having ordinary skill in the art will recognize that the principles of the present disclosure may be applied to any type of hydrodynamic component, including, but not limited to, pumps, turbines, valves, propellers, pipes for transporting fluids (e.g., liquids), and any other component exposed to a proximally flowing fluid. In addition, it will also be readily apparent to those having ordinary skill in the art that the principles of the present disclosure may be utilized with components experiencing cavitation in the absence of actual flowing fluid.

In the illustrated exemplary embodiment, fuel injector nozzle 10 may include an injector body 11 that defines a hollow interior 12 for receiving a needle valve member 13. Injector body 11 may also include a plurality of nozzle openings 14 disposed in a lower portion 15 of injector body 11. Needle valve member 13 may be slidably moveable within interior 12 between an upward open position (not shown) and a downward closed position. A lower portion 16 of needle valve member 13 may be configured to be slidably received within a bore 17, which may extend from hollow interior 12 and may define a seating surface 18, so as to control the flow of fuel through nozzle openings 14.

Figure 2:
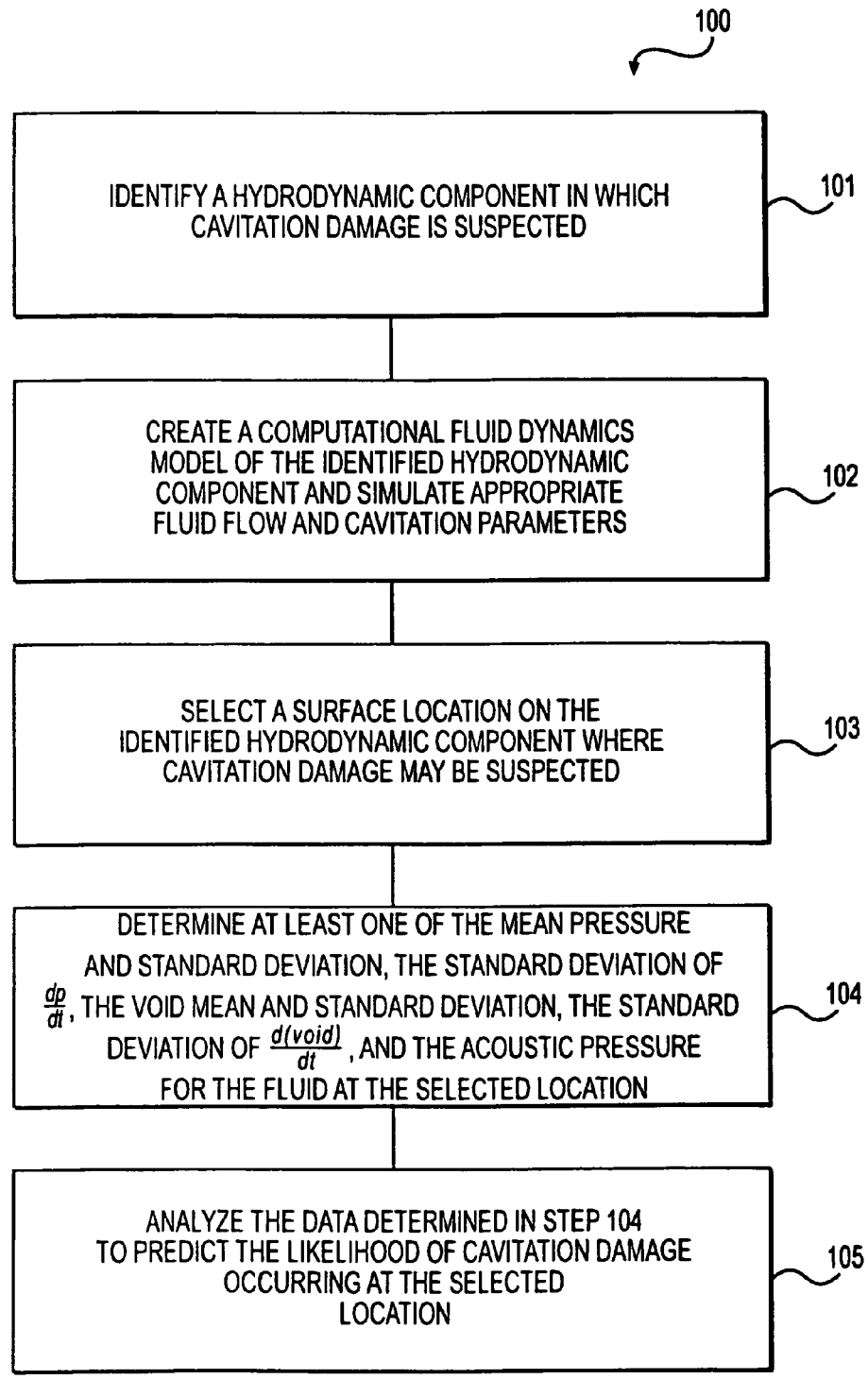
FIG. 2 is a flow chart of an exemplary method for predicting the likelihood of cavitation damage occurring in a hydrodynamic component having a surface exposed to flowing fluid, in accordance with an embodiment of the present disclosure.
Figure 3:
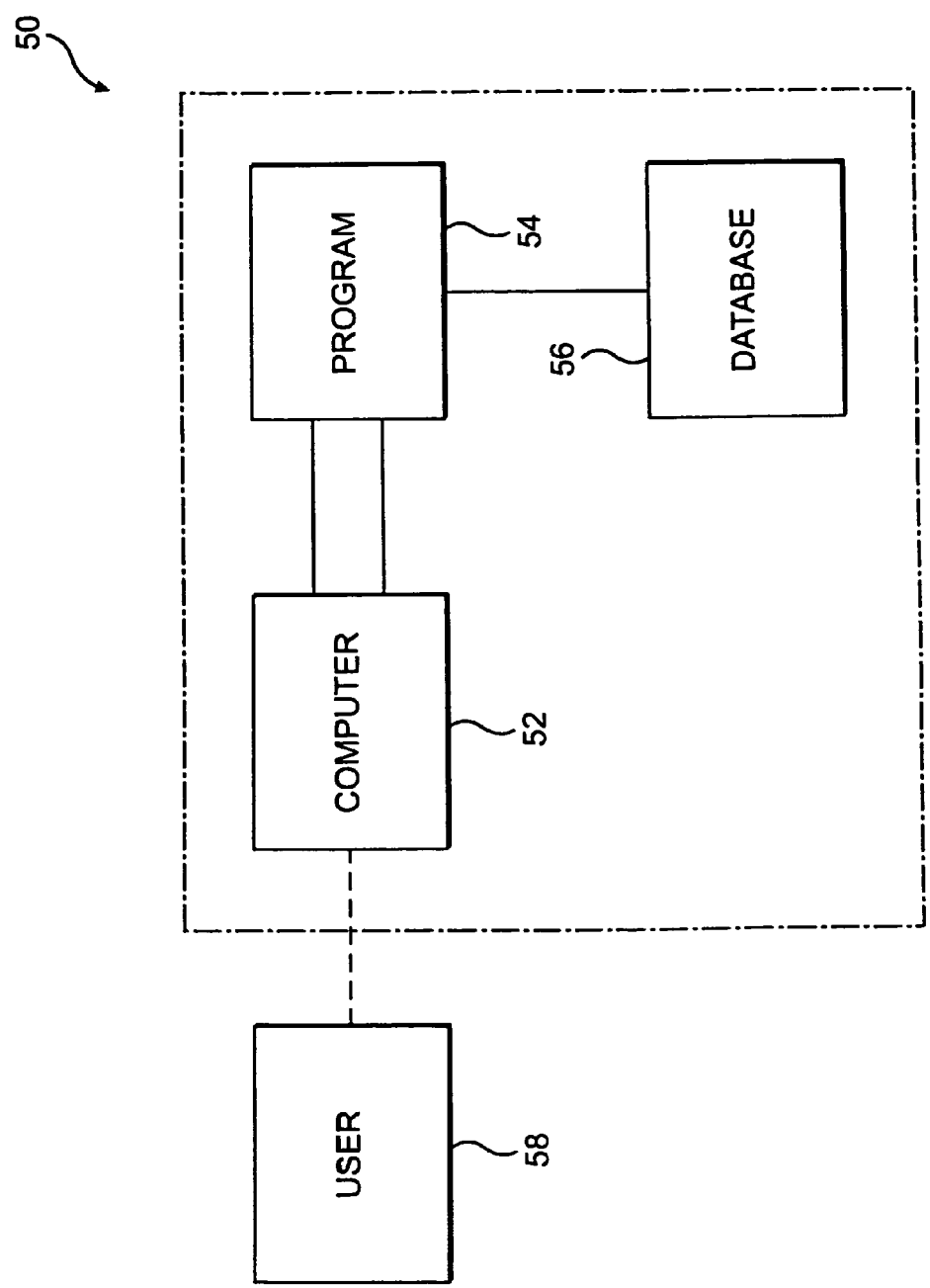
FIG. 3 is a schematic illustration of an exemplary work environment for performing the method of FIG. 2.

In accordance with an embodiment of the present disclosure, FIG. 2 illustrates an exemplary method 100 which may be performed by a system user, such as, for example, user 58 depicted in FIG. 3, to predict the likelihood of cavitation damage occurring in hydrodynamic components having a surface exposed to a proximally flowing fluid.

As shown in FIG. 2, method 100 may include a plurality of steps 101-105. Specifically, method 100 may include identifying a hydrodynamic component in which cavitation damage is suspected, step 101. Method 100 may also include creating a computational fluid dynamics ("CFD") model (i.e., simulation) of the identified hydrodynamic component and simulating appropriate fluid flow and cavitation (e.g., vapor) parameters, step 102. Method 100 may also include selecting a surface location on the identified hydrodynamic component where cavitation damage is suspected, step 103. Method 100 may further include determining at least one of the mean pressure and standard deviation, the standard deviation of the rate of change in pressure (i.e., the change in pressure over a given time)

$$\left(\frac{dp}{dt}\right),$$

the mean void percentage and standard deviation, the standard deviation of the rate of change in void percentage (i.e., the change in void percentage over a given time)

$$\left(\frac{d(\text{void})}{dt}\right)$$

and the acoustic pressure for the fluid flow at the selected location, step 104. Method 100 may also include analyzing the data determined in step 104 to predict the likelihood of cavitation damage occurring at the selected location, step 105.

It is contemplated that method 100 may be performed continuously, periodically, singularly, as a batch method, and/or may be repeated as desired. Specifically, it is contemplated that method 100 may be utilized to predict the occurrence of cavitation damage on a selected surface within an identified hydrodynamic component. It is also contemplated that one or more steps associated with method 100 may be selectively omitted, that the steps associated with method 100 may be performed in any order, and that the steps associated with method 100 are described in a particular sequence for exemplary purposes only.

With continuing reference to FIG. 2, step 101 may include, for example, identifying a hydrodynamic component in which cavitation damage is suspected. As set forth above, the principles of this disclosure provide a method for predicting the likelihood of cavitation damage occurring in any component having a surface exposed to flowing fluid. For example, method 100 may be used to predict the likelihood of cavitation damage on a particular surface within the exemplary fuel injector nozzle 10 depicted in FIG. 1.

Next, step 102 of method 100 may include creating a CFD model (or simulation) of the identified hydrodynamic component and simulating appropriate fluid flow and cavitation (e.g., vapor) parameters. As known to those skilled in the art, CFD may include a discipline of fluid mechanics that utilizes numerical methods and algorithms to solve and analyze problems that involve fluid flows. Computers may be used to perform the millions of calculations required to simulate the interaction of fluids and gases with the complex surfaces used in engineering. Specifically, CFD modeling is the process of modeling fluid flows by the numerical solution of the governing partial differential equations or other mathematical equations of motion.

Once a suitable CFD model of the identified hydrodynamic component has been created and the appropriate fluid flow parameters have been simulated, suitable cavitation (e.g., vapor) parameters may also be simulated. The cavitation parameters may be simulated by including a suitable vapor and/or bubble model within the CFD simulation. Suitable vapor and/or bubble models may include, but are not limited to, simulations that include the generation and collapse of bubbles within the simulated fluid flow. As known to those having ordinary skilled in the art, suitable CFD models, including simulated fluid flow and cavitation (e.g., vapor) parameters, may be generated with the aid of any of a number of commercially available CFD software products, such as, for example, FLUENT®.

Once a suitable CFD model, including simulated fluid flow and cavitation parameters, of the hydrodynamic component has been created, step 103 of method 100 may include selecting a surface location within the CFD model of the hydrodynamic component. For example, surface 14a within nozzle opening 14 may be selected. It is contemplated that one or more locations on a single surface and/or a plurality of surfaces may be selected. Furthermore, it is contemplated that surface selection may be based on, for example, actual evidence of cavitation damage, mathematical calculations indicating the possibility of cavitation damage, and/or engineering guesses.

Next, step 104 of method 100 may include determining at least one of the mean pressure and standard deviation, the standard deviation of the rate of change in pressure, the mean void percentage and standard deviation, the standard deviation of the rate of change in void percentage, and the acoustic pressure for the fluid flow at the selected location.

Although the definitions, formulas, and calculation methods for the established mathematical concepts of mean, standard deviation, and rate of change will be readily apparent to those having ordinary skill in the art, a short description and calculation technique for each of these values is provided below for exemplary purposes only.

It is contemplated that the mean (i.e., arithmetic mean) pressure at the selected location may be determined by any appropriate method for determining mean pressure. For example, the mean pressure may be calculated by making a plurality of pressure measurements for the fluid flow at the selected location, summing together all of the measurements, and dividing the sum of the pressure measurements by the number of pressure measurements made. It will be readily apparent to those of ordinary skill in the art that making the pressure measurements referred to above may include, but is not limited to, instructing the CFD software product to provide the simulated pressure values within the CFD simulation of the hydrodynamic component. Additionally, those having ordinary skill in the art will recognize that the number of pressure measurements made and the time interval between each measurement may be dependent upon the characteristics of the fluid flow and/or the hydrodynamic component itself. Furthermore, the time interval between each pressure measurement may be constant or may be varied as desired.

For the purposes of this disclosure, the mathematical concept of "standard deviation" generally refers to the statistical measure of spread or variability, as is widely known to those having ordinary skill in the art. That is to say, the standard deviation of the pressure represents the average deviation of a set of pressure measurements from the mean pressure. It is contemplated that the standard deviation of the fluid pressure at the selected location may be calculated by any suitable method for determining standard deviation. For example, the standard deviation of the pressure at the selected location may be determined with the aid of a commercially available software product configured to make statistical calculations, the CFD software product used to model the identified hydrodynamic component, and/or with the aid of the following mathematical equation:

$$S = \sqrt{\frac{\sum (X - M)^2}{n - 1}} \quad (1)$$

In the above equation, "S" may correspond to the standard deviation, "X" may correspond to an individual measurement or calculation, "M" may correspond to the mean of all measurements or calculations, and "n" may correspond to the number of measurements or calculations made.

Also for the purposes of this disclosure, the standard deviation of the rate of change in pressure at the selected location may be calculated by any suitable method known to those having ordinary skill in the art. For example, the rate of change in pressure may be first determined by, for example, calculating the change in fluid pressure over a desired time at the selected location. Those having ordinary skill in the art will recognize that all rate of change calculations occur over a selected time-span, and that any suitable time-span may be used to determine the rate of change in fluid pressure at the selected location. Next, with the aid of, for example, Equation 1 identified above, the standard deviation of the rate of change in fluid pressure may be calculated, in order to determine the relative stability of the change in pressure with respect to time.

For the purposes of the present disclosure, the term "void percentage" refers to the percentage of vapor within a given volume that includes both liquid and vapor. It is contemplated that the mean void percentage of the fluid flow at the selected location may be determined by any appropriate method for determining both void percentage and its mean. For example, void percentage may be determined by making a plurality of measurements that identify the amount of vapor in a given volume that includes both liquid and vapor, and converting the vapor amounts to a percentage of the total volume. The mean of the void percentage may be then determined by summing together all of the determined void percentages and dividing the sum of void percentages by the number of void percentage calculations made. It will be readily apparent to those of ordinary skill in the art that determining the void percentages referred to above may include, but is not limited to, instructing the CFD software product to provide the simulated fluid void percentage values within the CFD simulation of the hydrodynamic component. Additionally, those having ordinary skill in the art will recognize that the number of vapor measurements and/or void percentage calculations made and the time interval between each measurement/calculation may be dependent upon the characteristics of the fluid flow, the selected cavitation parameters, and/or the hydrodynamic component itself. Furthermore, the time interval between each vapor measurement and/or void percentage calculation may be constant or may be varied as desired.

The standard deviation of the rate of change in fluid void percentage at the selected location may be calculated by any suitable method known to those having ordinary skill in the art. For example, the rate of change in void percentage may be first determined by, for example, calculating the change in void percentage of the fluid over a desired time at the selected surface location. As stated above, those of ordinary skill in the art will recognize that all rate of change calculations occur over a selected time-span, and that any desired time-span may be used to determine the rate of change in void percentage for the fluid at the selected location. Next, with the aid of, for example, Equation 1 identified above, the standard deviation of the rate of change in void percentage may be calculated, in order to determine the relative stability of the change in void percentage for the fluid at the selected location with respect to time.

Also for the purposes of this disclosure, acoustic pressure (represented as $P_{acoustic}$) may be defined as the pressure deviation from the local ambient pressure caused by a sound wave. It is contemplated that the acoustic pressure at the selected surface location may be calculated by any suitable method known to those having ordinary skill in the art. For example, acoustic pressure at the selected surface location may be calculated with the following mathematical equation:

$$P_{acoustic} = \frac{\rho}{4\pi l}\left[\frac{d^2 V}{d t^2}\right] \quad (2)$$

In the above equation, "$\rho$" may correspond to the fluid density, "t" may correspond to time, "l" may correspond to the distance of a vapor bubble from a boundary wall, and "V" may correspond to the bubble volume.

It is contemplated that one or more of the above values for the selected location may be automatically determined (e.g., calculated) by the CFD software product used to create the CFD model of step 102. However, those having ordinary skill in the art will recognize that each of these values may be determined by any of a number of suitable methods, including, but are not limited to, mathematical calculations done by hand.

Step 105 may include analyzing the data determined in step 104 to predict the likelihood of cavitation damage occurring at the selected location. It is contemplated that this step may be completed either by the CFD software product used to create the CFD model of step 102 and/or by a user, such as, for example, user 58, operating the CFD software product. For the purposes of this disclosure, analyzing data may include evaluating, considering, summarizing, organizing, comparing, recording and/or tabulating the data determined in step 104. For example, analyzing the determined data may include comparing the data to previously tabulated values known to correspond to differing levels of cavitation damage, to see whether the determined values are indicative of cavitation damage occurring. Rather than comparing each one of the determined values to a corresponding known value, it is contemplated that analyzing the data may also include calculating a single scaled score by, for example, weighting and/or averaging each of the determined values, which may then be compared to previously tabulated scaled scores known to correspond to differing levels of cavitation damage. In instances where new designs and/or new hydrodynamic components are being evaluated for cavitation damage, it is contemplated that analyzing the determined data may include creating a database by recording the values determined in step 104 (i.e., mean pressure and standard deviation, standard deviation of the rate of change in pressure, mean void percentage and standard deviation, standard deviation of the rate of change in void percentage, and acoustic pressure) for the fluid at a particular location within a specific type of hydrodynamic component where cavitation damage is known to occur, in order to establish what ranges of these values in that type of hydrodynamic component are indicative of cavitation damage occurring.

FIG. 3 illustrates an exemplary work environment 50 for performing one or more steps 101-105 of method 100. Work environment 50 may include a computer 52, a program 54, and a database 56. Work environment 50 may be configured to accept inputs from a user 58 via computer 52 to perform suitable computations required by method 100. Work environment 50 may be further configured to communicate and/or display data or graphics to user 58 via computer 52. It is contemplated that work environment 50 may include additional components such as, for example, a communications interface (not shown), a memory (not shown), and/or other components known in the art.

Computer 52 may include a general purpose computer configured to operate executable computer code (e.g., programming instructions) provided on a computer readable medium and/or stored in a memory. Computer 52 may also include one or more input devices, such as, for example, a keyboard (not shown) or mouse (not shown), to introduce inputs from user 58 into work environment 50, and may include one or more output devices, such as, for example, a monitor, to deliver outputs from work environment 50 to user 58. Specifically, user 58 may deliver one or more inputs, such as, for example, data and/or simulation parameters, into work environment 50 via computer 52 to supply data associated with any of the steps of method 100 and/or execute program 54. Computer 52 may also include one or more data manipulation devices, such as, for example, data storage or software programs (not shown), to transfer and/or alter user inputs. Computer 52 may also include one or more communication devices, such as, for example, a modem (not shown) or a network link (not shown), to communicate inputs and/or outputs with program 54. It is contemplated that computer 52 may further include additional and/or different components, such as, for example, a memory (not shown), a communications hub (not shown), a data storage (not shown), a printer (not shown), an audio-video device (not shown), removable data storage devices (not shown), and/or other suitable components known in the art. It is also contemplated that computer 52 may communicate with program 54 via, for example, a local area network ("LAN"), a hardwired connection, and/or or the Internet. It is further contemplated that work environment 50 may include any number of computers and that each computer associated with work environment 50 may be accessible by any number of users for inputting data into work environment 50, communicating data with program 54, and/or receiving outputs from work environment 50.

Program 54 may include a computer executable code routine provided on a computer readable medium and configured to perform one or more sub-routines and/or algorithms to perform computations associated with method 100 within work environment 50. Specifically, program 54, in conjunction with user 58, may be configured to perform one or more steps of method 100. Program 54 may receive inputs, such as, for example, data and/or simulation parameters, from computer 52 and perform one or more algorithms to manipulate the received data and/or perform computations associated with method 10. Program 54 may also deliver one or more outputs, such as, for example, algorithmic results, and/or communicate, for example, via an electronic communication, the outputs to a user 58 via computer 52. Program 54 may also access database 56 to locate and manipulate data stored therein to arrange and/or display stored data and/or graphical simulations of the stored data, such as, for example, the locations of possible cavitation damage, to user 58 via, for example, an interactive object oriented computer screen display and/or a graphical user interface. It is contemplated that program 54 may be stored within the memory (not shown) of computer 52, on a remote server (not shown) accessible by computer 52, and/or on a computer readable medium. It is also contemplated that program 54 may include additional sub-routines and/or algorithms to perform various other operations with respect to mathematically representing data or simulation parameters, generating or importing additional data into program 54, and/or performing other computer executable operations. It is further contemplated that program 54 may include any type of computer executable code, such as, for example, C++, and/or may be configured to operate on any type of computer software, including, but not limited to, CFD software packages, such as, for example, FLUENT®.

Database 56 may be configured to store and arrange data and to interact with program 54. Specifically, database 56 may be configured to store a plurality of data, such as, for example, data associated with any of the steps of method 100. Database 56 may store and arrange any quantity of data arranged in any suitable or desired format. Program 54 may be configured to access database 56 to identify particular data therein and display such data to a user. It is contemplated that database 56 may include any suitable type of database, such as, for example, a spreadsheet, a two-dimensional table, or a three-dimensional table, and may arrange and/or store data in any manner known in the art, such as, for example, within a hierarchy or taxonomy, in groupings according to associated documents, and/or searchable according to associated identity tags. It is also contemplated that database 56 may include a single database and/or any quantity of databases.

INDUSTRIAL APPLICABILITY

As alluded to above, the method and system of the present disclosure are generally applicable to any hydrodynamic component having surface portions exposed to flowing fluid. Method 100 may be utilized to predict the likelihood of cavitation damage occurring at a selected surface location within an identified hydrodynamic component. The operation of method 100 is described below with respect to the fuel injector nozzle 10 of FIG. 1 for exemplary purposes only and it is understood that method 100 is applicable to any type of hydrodynamic component having surfaces exposed to a fluid.

With reference to FIGS. 1-3, a system user 58, such as, for example, an engineer or designer, may desire to assess the likelihood of cavitation damage occurring at a specific location within a recently re-designed hydrodynamic component, such as, for example, fuel injector nozzle 10 (step 101). Accordingly, with the aid of any suitable, commercially-available CFD software product, such as, for example, FLUENT®, user 58 may create a CFD model of the fuel injector nozzle 10. For example, user 58 may do so by creating a three-dimensional solid model simulation of fuel injector nozzle 10 within FLUENT®. Next, user 58 may instruct and/or configure FLUENT® to simulate appropriate fluid flow and cavitation parameters within and/or about the simulated solid model of fuel injector 100 (step 102). For example, user 58 may instruct FLUENT® to simulate fuel flowing from within bore 17 out through nozzle openings 14. In addition, user 58 may also instruct FLUENT® to simulate the generation and collapse of appropriate vapor bubbles (i.e., cavitation) within the fuel flow.

Once user 58 has created a satisfactorily accurate simulation of fuel injector nozzle 10 as used during its intended operation, user 58, based on experience or actual evidence, may select a surface location on or within the simulated fuel injector (step 103), for which the likelihood of cavitation damage occurring is to be predicted. For example, user 58 seeking the cause of material failure in tips of fuel injector nozzles similar to fuel injector nozzle 10 may select a location 14a on a surface within nozzle opening 14 for evaluation.

Next, user 58 may determine, for example, by instructing and/or configuring FLUENT® to calculate and display, at least one of the mean pressure and standard deviation, the standard deviation of the rate of change in pressure, the mean void percentage and standard deviation, the standard deviation of the rate of change in void percentage, and the acoustic pressure for the fuel flow at the selected location (step 104).

Subsequently, user 58 may choose to analyze the data determined in step 104 in any of a number of ways, in order to predict the likelihood of cavitation damage occurring at the selected location. For example, user 58 may choose to compare the determined data against predetermined ranges or values indicative of differing levels of cavitation damage occurring. In addition, user 58 may choose to use the determined data to calculate, for example, by weighting and/or averaging the determined values, a single score. User 58 may then compare that score against ranges or values indicative of differing levels of cavitation damage occurring.

It will be apparent to those skilled in the art that various modifications and variations can be made to the systems and methods of the present disclosure without departing from the scope of the disclosure. In addition, other embodiments will be apparent to those skilled in the art from the consideration of the specification and practice of the systems and methods disclosed herein. It is intended that the specification and examples be considered as exemplary only, with a true scope of the disclosure being indicated by the following claims and their equivalents.

What is claimed is:

1. A method for predicting the likelihood of cavitation damage occurring on a surface of a hydrodynamic component, the method comprising:
   creating a computational fluid dynamics (CFD) simulation of the hydrodynamic component, wherein creating the CFD simulation includes simulating a fluid proximal to the surface of the hydrodynamic component;
   selecting a location on the surface of the hydrodynamic component, wherein the selected location is exposed to the simulated fluid;
   determining the mean pressure and standard deviation, the standard deviation of the rate of change in pressure, the mean void percentage and standard deviation, and the standard deviation of the rate of change in void percentage for the fluid at the selected surface location; and analyzing at least one of the mean pressure and standard deviation, the standard deviation of the rate of change in pressure, the mean void percentage and standard deviation, and the standard deviation of the rate of change in void percentage for the fluid at the selected surface location to predict the likelihood of cavitation damage occurring at the selected surface location.

2. The method of claim 1, wherein analyzing includes comparing the determined values for mean pressure and standard deviation, the standard deviation of the rate of change in pressure, the mean void percentage and standard deviation, and the standard deviation of the rate of change in void percentage for the fluid against values known to correspond to differing levels of cavitation damage.

3. The method of claim 1, wherein the fluid includes a liquid.

4. The method of claim 1, wherein creating the CFD simulation of the hydrodynamic component includes simulating generation and collapse of at least one vapor bubble within the simulated fluid.

5. The method of claim 2, wherein the method further comprises:
determining the acoustic pressure for the fluid at the selected surface location.

6. The method of claim 5, wherein analyzing further includes comparing the acoustic pressure of the fluid at the surface location against predetermined values known to correspond to differing levels of cavitation.

7. The method of claim 3, wherein the hydrodynamic component includes a fuel injector nozzle.

8. The method of claim 1, wherein the simulated fluid flows relative to the surface of the hydrodynamic component.

9. A method for predicting the likelihood of cavitation damage occurring at a surface location in a hydrodynamic component having a surface exposed to a fluid, the method comprising:
determining the mean pressure and standard deviation, the standard deviation of the rate of change in pressure, the mean void percentage and standard deviation, and the standard deviation of the rate of change in void percentage for the fluid at the surface location; and
analyzing at least one of the mean pressure and standard deviation, the standard deviation of the rate of change in pressure, the mean void percentage and standard deviation, and the standard deviation of the rate of change in void percentage to predict the likelihood of cavitation damage occurring at the surface location.

10. The method of claim 9, wherein the method further comprises creating a CFD simulation of the hydrodynamic component.

11. The method of claim 9, wherein analyzing includes comparing at least one of the determined values for mean pressure and standard deviation, the standard deviation of the rate of change in pressure, the mean void percentage and standard deviation, and the standard deviation of the rate of change in void percentage for the fluid against values known to correspond to differing levels of cavitation damage.

12. The method of claim 11, wherein the method further includes determining the acoustic pressure of the fluid at the surface location.

13. The method of claim 12, wherein analyzing further includes comparing the acoustic pressure of the fluid at the surface location against predetermined values known to correspond to differing levels of cavitation.

14. The method of claim 9, wherein the fluid includes fuel.

15. The method of claim 9, wherein the hydrodynamic component includes a fuel injector nozzle.

16. The method of claim 9, wherein analyzing includes determining a single score by calculating a weighted average of the determined values, and comparing the score against previously determined scores known to correspond to differing levels of cavitation damage.

17. The method of claim 9, wherein the fluid flows relative to the surface location.

18. A method for predicting the occurrence of cavitation damage, the method comprising:
identifying a hydrodynamic component in which cavitation damage is suspected;
creating a CFD simulation of the hydrodynamic component, wherein creating the CFD simulation includes simulating a fluid proximal to the hydrodynamic component;
selecting a surface location on the hydrodynamic component, wherein the selected location is exposed to the fluid;
determining the mean pressure and standard deviation, the standard deviation of the rate of change in pressure, the mean void percentage and standard deviation, and the standard deviation of the rate of change in void percentage for the fluid at the selected surface location; and
analyzing at least one of the mean pressure and standard deviation, the standard deviation of the rate of change in pressure, the mean void percentage and standard deviation, and the standard deviation of the rate of change in void percentage for the fluid at the selected surface location to predict the occurrence of cavitation damage at the selected surface location.

19. The method of claim 18, wherein analyzing includes comparing the determined mean pressure and standard deviation, standard deviation of the rate of change in pressure, mean void percentage and standard deviation, and the standard deviation of the rate of change in void percentage for the fluid against values known to correspond to differing levels of cavitation damage.

20. The method of claim 18, wherein the fluid includes a liquid.

21. The method of claim 18, wherein creating the CFD simulation of the hydrodynamic component includes simulating generation and collapse of at least one vapor bubble within the simulated fluid.

22. The method of claim 19, wherein the method further comprises:
determining the acoustic pressure for the fluid at the selected surface location.

23. The method of claim 22, wherein analyzing further includes comparing the acoustic pressure of the fluid at the selected surface location against predetermined values known to correspond to differing levels of cavitation damage.

24. The method of claim 20, wherein the hydrodynamic component includes a fuel injector nozzle.

25. The method of claim 18, wherein the simulated fluid flows adjacent to the selected surface location.

26. A work environment for predicting the likelihood of cavitation damage occurring at a surface location on a hydrodynamic component having a surface exposed to a fluid, the work environment comprising:
a computer configured to receive a plurality of inputs from a user, at least a first portion of the plurality of inputs relating to the hydrodynamic component;
a database configured to store data relating to the fluid;

a computer readable medium containing programming instructions for predicting the likelihood of cavitation damage occurring at the surface location, the programming instructions comprising:

creating a CFD simulation of the hydrodynamic component and simulating the fluid proximal to the hydrodynamic component;

determining the mean pressure and standard deviation, the standard deviation of the rate of change in pressure, the mean void percentage and standard deviation, and the standard deviation of the rate of change in void percentage for the fluid at the surface location; and analyzing at least one of the mean pressure and standard deviation, the standard deviation of the rate of change in pressure, the mean void percentage and standard deviation, and the standard deviation of the rate of change in void percentage to predict the likelihood of cavitation damage occurring at the surface location.

27. The work environment of claim 26, wherein analyzing includes comparing the determined values for mean pressure and standard deviation, the standard deviation of the rate of change in pressure, the mean void percentage and standard deviation, and the standard deviation of the rate of change in void percentage for the fluid against predetermined values known to correspond to differing levels of cavitation damage.

28. The work environment of claim 27, wherein the programming instructions further comprise:

determining the acoustic pressure for the fluid at the surface location.

29. The work environment of claim 28, wherein analyzing further includes comparing the acoustic pressure of the fluid at the surface location against predetermined values known to correspond to differing levels of cavitation.

30. The work environment of claim 26, wherein the hydrodynamic component includes a fuel injector nozzle.

31. The work environment of claim 26, wherein creating the CFD simulation of the hydrodynamic component includes simulating generation and collapse of at least one vapor bubble within the simulated fluid.

32. The work environment of claim 26, wherein the fluid flows relative to the surface location of the hydrodynamic component.

* * * * *

UNITED STATES PATENT AND TRADEMARK OFFICE
CERTIFICATE OF CORRECTION

PATENT NO. : 7,912,687 B2  
APPLICATION NO. : 12/000148  
DATED : March 22, 2011  
INVENTOR(S) : Stockner et al.

Page 1 of 1

It is certified that error appears in the above-identified patent and that said Letters Patent is hereby corrected as shown below:

In the Specification

Column 4, lines 51-53, delete " $\left(\frac{d(void)}{dt}\right)$ " and insert -- $\left(\frac{d(void)}{dt}\right)$, --.

Signed and Sealed this  
Eleventh Day of August, 2015

Michelle K. Lee  
*Director of the United States Patent and Trademark Office*